United States Patent
Daufratshofer et al.

(10) Patent No.: US 7,871,315 B2
(45) Date of Patent: Jan. 18, 2011

(54) DEVICE FOR GATHERING SAUSAGE CASINGS FILLED WITH FILLING MATERIAL

(75) Inventors: Ernst Daufratshofer, Oberrieden (DE); Matthias Kranz, Norderstedt (DE)

(73) Assignee: Tipper Tie technopack GmbH, Glinde (DE)

( * ) Notice: Subject to any disclaimer, the term of this patent is extended or adjusted under 35 U.S.C. 154(b) by 300 days.

(21) Appl. No.: 12/179,202

(22) Filed: Jul. 24, 2008

(65) Prior Publication Data

US 2009/0029637 A1    Jan. 29, 2009

(30) Foreign Application Priority Data

Jul. 27, 2007    (DE)    .................. 20 2007 010 587 U

(51) Int. Cl.
*A22C 11/00*    (2006.01)

(52) U.S. Cl. ...................................................... 452/31

(58) Field of Classification Search ............. 452/21–26, 452/30–32, 35, 37, 46–48, 51
See application file for complete search history.

(56) References Cited

U.S. PATENT DOCUMENTS

| | | | |
|---|---|---|---|
| 4,017,941 A * | 4/1977 | Raudys et al. ................. | 452/31 |
| RE30,390 E * | 9/1980 | Kupcikevicius et al. ........ | 452/31 |
| 4,430,772 A * | 2/1984 | Michel et al. .................. | 452/32 |
| 4,438,545 A * | 3/1984 | Kupcikevicius et al. ........ | 452/32 |
| 4,847,951 A * | 7/1989 | Kollross ....................... | 452/48 |
| 4,980,949 A * | 1/1991 | Stanley ......................... | 452/37 |
| 5,167,567 A * | 12/1992 | Evans ........................... | 452/37 |
| 5,173,074 A * | 12/1992 | Farkonas et al. .............. | 452/29 |
| 5,730,163 A | 3/1998 | Meyer et al. | |
| 5,743,792 A * | 4/1998 | Hanten et al. ................. | 452/37 |
| 5,803,801 A * | 9/1998 | Vrijsen ........................ | 452/35 |
| 5,842,915 A | 12/1998 | Plewa et al. | |
| 6,117,003 A * | 9/2000 | Brinson ....................... | 452/31 |
| 6,217,436 B1 | 4/2001 | Hanten et al. | |
| 6,524,178 B1 * | 2/2003 | Fassler et al. ................. | 452/37 |
| 6,705,063 B1 | 3/2004 | Topfer et al. | |
| 6,932,689 B2 * | 8/2005 | Stimpfl ........................ | 452/49 |
| 7,479,057 B2 * | 1/2009 | Waldstaedt et al. ........... | 452/32 |
| 7,575,506 B2 * | 8/2009 | Ebert et al. ................... | 452/35 |

(Continued)

FOREIGN PATENT DOCUMENTS

DE    27 30 603    10/1981

(Continued)

*Primary Examiner*—Thomas Price
(74) *Attorney, Agent, or Firm*—Myers Bigel Sibley & Sajovec, P.A.

(57) ABSTRACT

Devices for gathering sausage casings (1) filled with filling material, include at least one gathering element (2a, 2b) which can be fed from an initial position to an end position in the direction of the casing axis, and a mechanical drive (4a, 4b) for this gathering element (2a, 2b), which is assigned a control unit (6) for the movement sequence of the gathering element (2a, 2b). The devices are characterized in that the control unit (6) is designed in such a way that, automatically, the gathering element (2a, 2b) can be stopped during the feed movement in a forward reversal position between initial and end position, moved back in the direction of the initial position, stopped again in a rear reversal position and set moving in the direction of the end position again.

20 Claims, 3 Drawing Sheets

Figure 1:
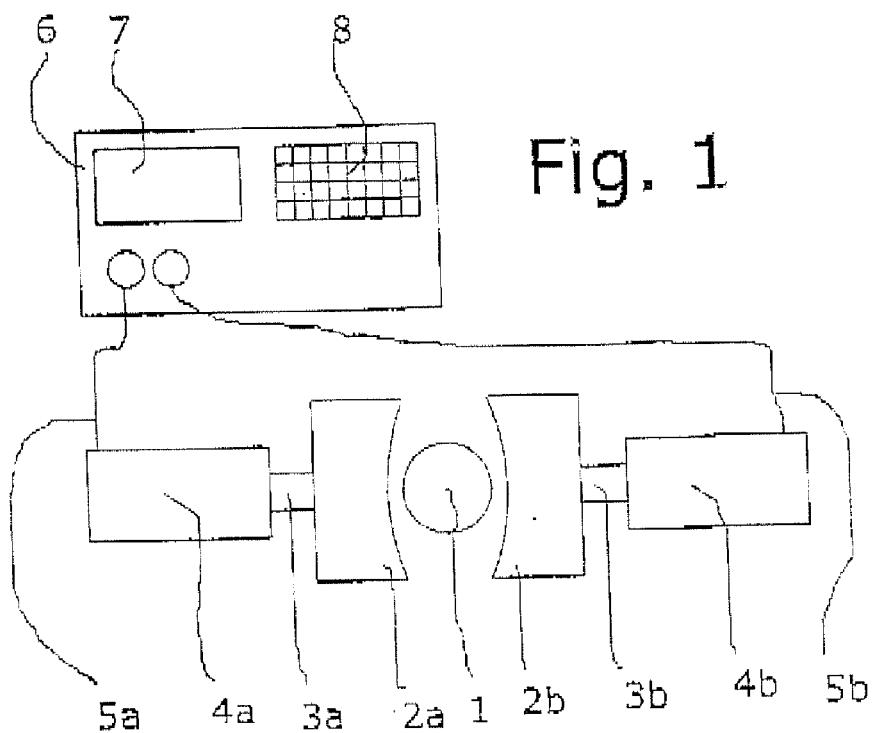

U.S. PATENT DOCUMENTS 7,604,531 B2 * 10/2009 Hanten ......... 452/48
7,618,307 B2 * 11/2009 Gladh ......... 452/51
7,666,072 B2 *  2/2010 Schalk ......... 452/48

FOREIGN PATENT DOCUMENTS

| | | |
|---|---|---|
| DE | 196 01 720 | 8/1996 |
| DE | 10 2004 007 827 | 9/2005 |
| DE | 20 2006 019 897 | 7/2007 |
| EP | 0 963 698 A1 | 6/1998 |
| EP | 0 963 699 | 6/1998 |

* cited by examiner

DEVICE FOR GATHERING SAUSAGE CASINGS FILLED WITH FILLING MATERIAL

The invention relates to a device for gathering sausage casings filled with filling material, according to the precharacterizing clause of claim 1.

Devices of the generic type are primarily used in the manufacture of sausages when closing the tube-like artificial or natural casings filled with sausage meat. In the process, the open end of the casing closed on one side is slipped over the filling pipe of a filling machine. Through the pipe, the filling machine then puts sausage meat into the casing, which is gradually pulled off the filling pipe by the pressure of the following surging sausage meat. When a sufficiently long section of casing has been pulled off the filling pipe, it can be closed with a closure means. The closure means used are normally small metallic U-shaped clips. However, in order that the clip can embrace the casing, its circumference must be reduced. This is done by generic devices. They gather the sausage meat that is put in in such a way that a constriction free of filling material is formed, around which the clip can be placed.

Devices of the generic type are known in many types of design. For instance, DE 19 6 44 074 C2 shows a device in which sheet-metal-like displacement shears are moved linearly towards each other. Their edges facing the casing are shaped in a suitable way such that the casing is constricted as far as possible without damage. EP 0 963 698 A1 discloses gathering plates, in a similar configuration, which are not fed linearly but with a pivoting movement. The number of gathering elements can also be more than two, as in the case of the at least three constricting elements of DE 199 34 154 C1. Also known, finally, are devices having only one movable gathering element, such as a gathering plate that can be moved against a stationary apron in EP 0 782 528 B1 or in EP 0 963 699 B1.

In specific applications, in particular when the sausage meat contains coarse lumps, under certain circumstances still frozen, it is difficult to fill the casing uniformly. In order nevertheless to achieve the most uniform filling possible, the filling machine must apply considerable pressure. When the gathering elements are then pressed on the casing, an additional pressure is exerted. As a result, an increased danger of bursting of the casing arises.

The invention is based on the object of countering this danger. In order to achieve the said object, it proposes the features of the characterizing part of claim 1. The subclaims contain advantageous refinements.

The invention is based on the idea of loosening the sausage meat in the filled casing mechanically so that it is better distributed. An increased pressure for achieving a uniform distribution may possibly then no longer be necessary. In any case, however, the mechanically produced better distribution of the coarse pieces of sausage meat in the casing already reduces the danger of bursting. The invention is further based on the idea of using the gathering elements or at least one of the latter, which are present in any case, for the mechanical action on the casing. Instead of moving the gathering element in a continuous movement as far as its end position, it is moved to and fro on the way there. As a result, the casing is "massaged" to a certain extent and the coarse pieces of sausage meat are distributed gradually more uniformly by the alternating constriction and expansion.

Gathering elements according to the invention can all be sufficiently solid bodies provided with suitable edges which are able to exert pressure on a filled sausage casing. At least one thereof must be able to execute a feed movement in the direction of the casing axis. The casing axis is the axis of symmetry of the filled tube-like casing. The movement begins in an initial position, which can be any position in which the gathering element is not exerting any pressure on the filled casing. The movement ends in an end position. This is a position in which the casing has been constricted together so tightly that a closure means can embrace it. Ideally, there is no longer any filling material at all in the gathered casing region. The direction of the casing axis does not have to coincide with the shortest imaginary connecting line between gathering element and casing axis. Instead, the critical factor is that the zone of contact between gathering element and casing moves closer and closer to the casing axis.

According to the invention, there is a mechanical drive for at least one of the gathering elements. This is to be understood to mean any type of drive apart from manual actuation, including electrical, pneumatic, hydraulic. In particular, the drive can be derived from a cam control system.

According to the invention, the drive is assigned a control unit for the movement sequence of the gathering element. A control unit according to the invention is in this case any device which at least partly influences the movement sequence of the gathering element. The control unit can comprise a simple mechanical stop. It can also involve regulation of the exact time sequence in accordance with the predefinition of an adjustable intended time sequence. In this case, the drive can be formed by a servo motor, for example, and the control unit can be a programmable computing unit. Whether or not the drive for the gathering element is coupled to other drives, for example for other gathering elements or for a ram which moves the closure means, is unimportant.

It is characteristic of the invention that the control unit is designed in such a way that automatically, that is to say without the participation of an operator, it is able to interrupt the feed movement before reaching the end position and to move the gathering element back before the feed movement is continued, so that the device "massages" the filled casing.

This automatic action can advantageously be deactivated, so that the device can be operated both conventionally and also with the "massaging movement".

Advantageously, the automatic action can be carried out repeatedly, for example two or three times. This reinforces the effect of the "massaging movement" according to the invention. In this case, it is further advantageous if the forward reversal positions lie closer and closer to the end position. As a result, the intensity of the "massaging movement" is gradually increased. In these cases, it is moreover advantageous if the rear reversal position lies closer and closer to the end position. This is because the filled casing will need less space from occasion to occasion during each expansion as the gathering element is moved back. If the gathering element is accordingly moved back less far from occasion to occasion, time will be saved.

Advantageously, at least one forward reversal position can be predefined. This can be done by the duration of the feed movement as far as this forward reversal position being adjustable. However, it is also conceivable to register the position of the gathering element with one or more sensors, which gives or give the control device a signal to stop the gathering element when the latter has reached the predefined position. With this ability to be predefined, the device can be adapted better to the various applications, i.e. depending on the calibre of the sausages and the consistency of the sausage meat, the forward reversal position can be closer to or further removed from the end position. It is particularly advantageous if all the forward reversal positions can be predefined, since then appropriately accurate adaptation to the various applications is possible. The same is true of at least one or all the rear reversal positions.

Advantageously, at least one waiting time of the gathering element in a forward reversal position can be predefined. As a result, the "massaging movement" can also be adapted accurately to the respective applications. Once more, it is particularly advantageous if all the waiting times in the forward reversal positions can be adjusted. The same is true of at least one or all the waiting times in rear reversal positions.

Advantageously, a control system for the feed movement of the gathering element is provided, that is to say the variation over time of the force that is applied to the gathering element is predefined for at least part of the feed movement. Furthermore, it is advantageous if the control system is adjustable, that is to say the variation of the force over time can be predefined. These measures also improve the adaptation of the device to the various applications.

Advantageously, a regulating system for the feed movement of the gathering element is provided, that is to say, at least in part of the feed movement, the force which is applied to the gathering element at a specific time results from the deviation of the position of the gathering element at this time, registered by sensors, from a set point predefined for this time. In this case, it is particularly advantageous if the regulating system is adjustable, that is to say the variation over time of the set points for the positions of the gathering element can be predefined. These measures likewise improve the adaptation of the device to the various applications.

Advantageously, the control unit is programmable. The programs for the device can comprise data relating to reversal positions and/or waiting times. Advantageously, these programs are matched to individual applications. Furthermore, it is advantageous if the control unit has a memory unit for the storage of programs. This memory unit can, for example, comprise an EEPROM. Using such a memory unit, it is not necessary to enter the respective program again by hand when the application changes.

Advantageously, the control unit is set up in such a way that it determines at least one reversal position and/or waiting time and/or the number of changes of direction as a function of at least one property of the filling material. Such a property can be, for example, the temperature of the sausage meat or else its viscosity. It is recommended in particular to increase waiting times or the number of changes of direction all the more, the lower the temperature or the higher the viscosity of the filling material. For this purpose, it is additionally advantageous if the device according to the invention has at least one sensor for at least one property of the filling material, to which sensor the control device is connected via a signal line. This can in particular be a temperature sensor, which projects into the hopper of the filling machine or is fitted to this machine in another suitable way so that it can determine the temperature of the filling material.

The device according to the invention permits a method to be carried out for constricting a filled sausage casing, in which the casing is gathered to a smaller diameter by using at least one mechanically driven gathering element, the gathering element being fed from an initial position to an end position in the direction of the casing axis, being stopped automatically in a forward reversal position between initial and end position, then being moved back in the direction of the initial position, stopped again in a rear reversal position and being set moving in the direction of the end position again. The automatic stopping in a forward reversal position and moving back to a rear reversal position and renewed starting of movement in the direction of the end position can be repeated, for example two or three times, it being possible for the forward and/or rear end positions to move closer to the end position during each repetition. The gathering element can wait in at least one or all the forward and/or rear end positions for specific, possibly predefinable, times. Furthermore, the feed movement can be controlled and/or regulated, at least to some extent, with the effect mentioned above.

In the following text, the invention will be explained in more detail by using an exemplary embodiment. The six figures show a device according to the invention in six different phases of the feed movement.

On the two opposite sides of a sausage casing 1, of which the cross section is circular, there are two gathering plates 2a, 2b, i.e. two gathering elements. The edges of these gathering plates facing the sausage casing 1 are shaped in a suitable way, which is indicated in simplified form in the drawings by a concavely shaped edge. Each of the gathering plates 2a, 2b is driven linearly via a drive rod 3a, 3b by electric servo motors 4a, 4b in the direction of the axis of the sausage casing 1, that is to say in the direction of the centre of the circular cross section of the latter. The servo motors 4a, 4b are connected via electric control lines 5a, 5b to a control unit 6. The control unit 6 has a display 7 and keyboard 8. Via the keyboard 8, various programs for regulating the movement sequence of the servo motors 4a, 4b can be entered and retrieved. The programs are stored in the control unit in a memory unit, not illustrated. The device shown can be part of a closing machine, otherwise not shown, which in particular also has at least one ram for feeding a closure means onto the gathered sausage casing 1. Therefore, the control unit 6 can also be part of a control device for the entire closing machine, in which the movement of the gathering elements and of the ram and/or possible further components can then be coordinated with one another.

Figure 2:
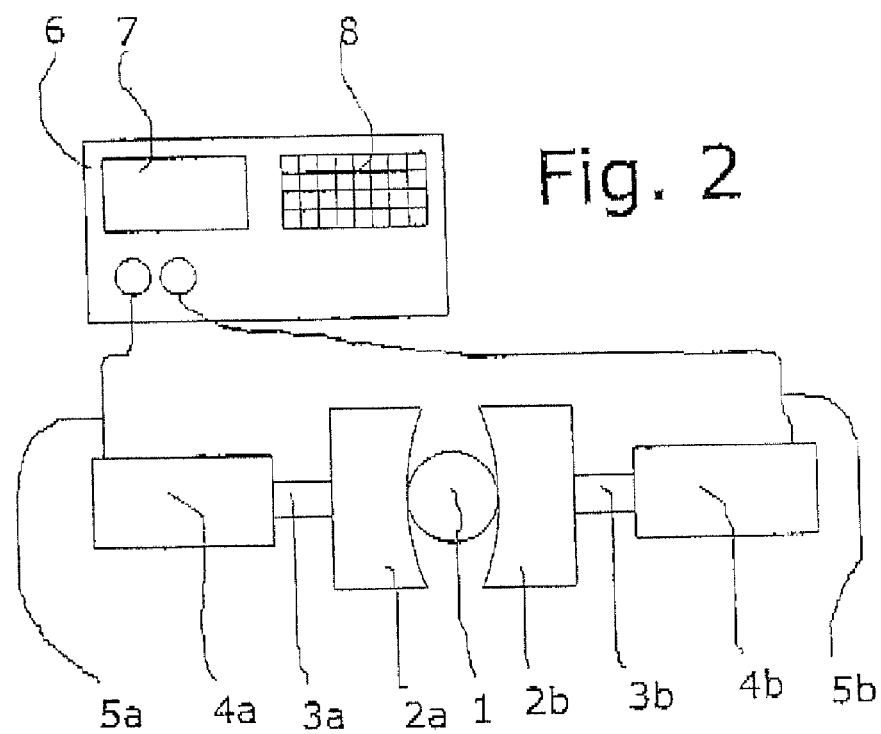
Figure 3:
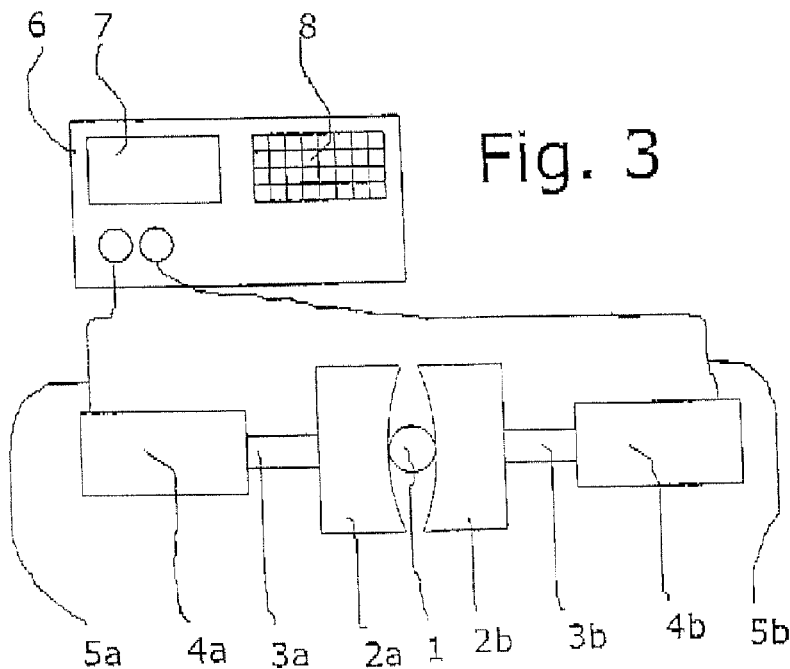

FIG. 1 shows the device in the initial position of the feed movement of the gathering plates 2a, 2b. In this phase, the sausage casing 1 has just been filled by the filling machine, not shown. In FIG. 2, the gathering plates 2a, 2b have been set moving, so that they encounter the sausage casing 1 and begin to gather it. In the phase shown in FIG. 3, the sausage casing 1 has been gathered a little further. A forward reversal position has been reached, in which the control unit 6 stops the gathering plates 2a, 2b.

Figure 4:
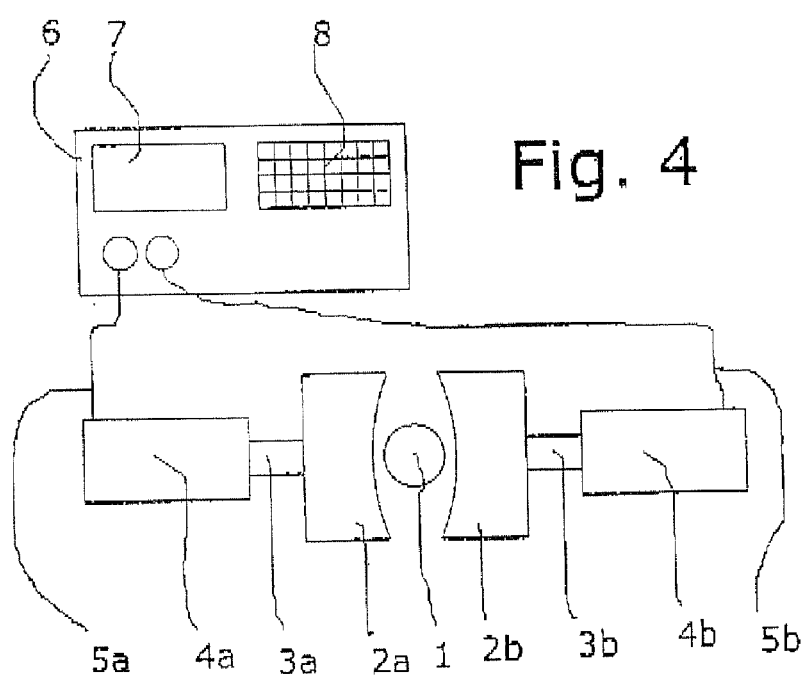

After a waiting time in this position, the gathering plates 2a, 2b are moved back until they reach the rear reversal position illustrated in FIG. 4. The sausage casing 1 can expand somewhat, it being possible for coarser lumps of the filling material to be rearranged, if appropriate. After the illustration in FIG. 4, the gathering plates 2a, 2b are drawn back to such an extent that they no longer touch the sausage casing 1. However, this is not absolutely necessary. The invention also comprises embodiments in which the sausage casing 1 expands while it remains in contact with the gathering elements 2a, 2b.

Figure 5:
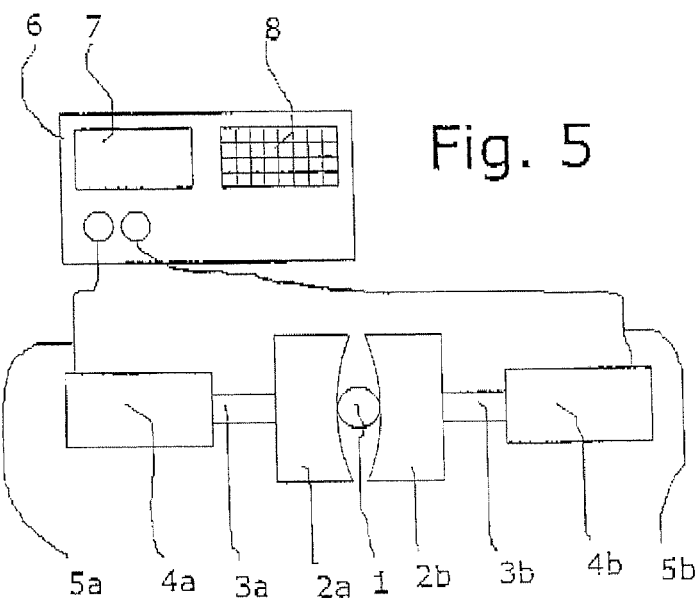
Figure 6:
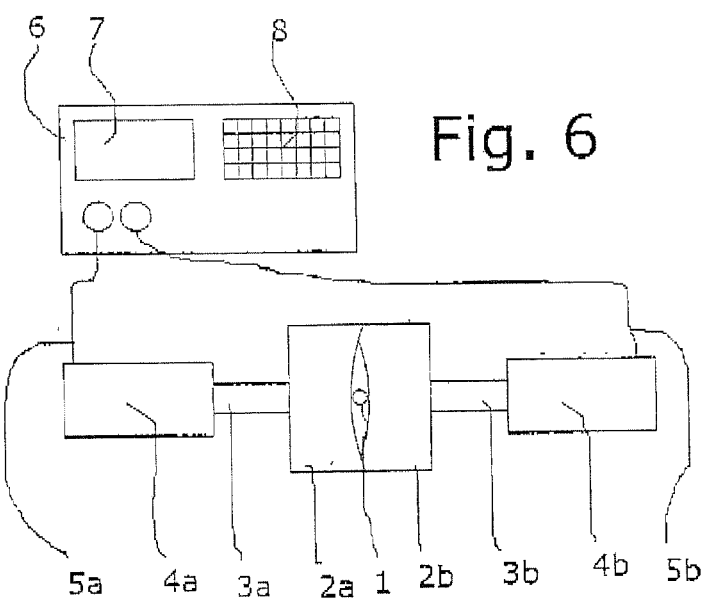

After a waiting time in the rear reversal position shown in FIG. 4, the gathering plates 2a, 2b are set moving in the direction of the sausage casing 1 again, so that the phase which can be seen from FIG. 5 is reached. The movement is continued until the gathering plates 2a, 2b have reached the end position shown in FIG. 6. The cross section of the sausage casing 1 is then so small that there is virtually no longer any filling material in the region between the gathering plates 2a, 2b, and the sausage casing 1 can be embraced, for example by a metallic closure clip, not shown.

That which is claimed:

1. Device for gathering sausage casings (1) filled with filling material, having at least one gathering element (2a, 2b)

which can be fed from an initial position to an end position in a longitudinal direction of a casing axis, and a mechanical drive (4a, 4b) for this gathering element (2a, 2b), which is assigned a control unit (6) for the movement sequence of the gathering element (2a, 2b), characterized in that the control unit (6) is designed in such a way that, automatically, the gathering element (2a, 2b) can be stopped during the feed movement in a forward reversal position between initial and end position with the gathering element (2a, 2b) retracted away from the filled casing, moved back in the direction of the initial position, stopped again in a rear reversal position and set moving in the direction of the end position again.

2. Device according to claim 1, characterized in that the control device (6) is designed in such a way that, automatically, the gathering element (2a, 2b) can be stopped repeatedly during the feed movement in forward reversal positions between initial and end position, then moved back in the direction of the initial position in each case, stopped again in a rear reversal position in each case and in each case set moving in the direction of the end position again.

3. Device according to claim 2, characterized in that each successive forward reversal position lies closer to the end position than the preceding forward reversal position.

4. Device according to claim 1, characterized in that each successive rear reversal position lies closer to the end position than the preceding rear reversal position.

5. Device according to claim 1, characterized in that at least one forward reversal position can be predefined as desired.

6. Device according to claim 1, characterized in that at least one rear reversal position can be predefined as desired.

7. Device according to claim 1, characterized in that at least one waiting time of the gathering element (2a, 2b) in a forward reversal position can be predefined.

8. Device according to claim 1, characterized in that all the waiting times of the gathering element (2a, 2b) in forward reversal positions can be predefined.

9. Device according to claim 1, characterized in that at least one waiting time of the gathering element (2a, 2b) in a rear reversal position can be predefined.

10. Device according to claim 1, characterized in that all the waiting times of the gathering element (2a, 2b) in rear reversal positions can be predefined.

11. Device according to claim 1, characterized in that the control unit (6) is set up in such a way that it determines at least one reversal position and/or waiting time and/or the number of changes of direction of the feed movement of the gathering element (2a, 2b) as a function of at least one property of the filling material.

12. Device according to claim 1, characterized in that it has at least one sensor for at least one property of the filling material, to which sensor the control device (6) is connected via a signal line.

13. Method for constricting a filled sausage casing (1), in which the casing (1) is gathered to a smaller diameter by using at least one mechanically driven gathering element (2a, 2b), the gathering element (2a, 2b) being fed from an initial position to an end position in the direction of a longitudinal casing axis, being stopped automatically in a forward reversal position between initial and end position with the gathering element (2a, 2b) retracted away from the filled casing, then being moved back in the direction of the initial position, stopped again in a rear reversal position and being set moving in the direction of the end position again.

14. Method according to claim 13, characterized in that the automatic stopping in a forward reversal position and moving back to a rear reversal position and renewed starting of movement in the direction of the end position is repeated.

15. Method according to claim 14, characterized in that forward and rear end positions move closer to the end position during each repetition.

16. Device for gathering sausage casings (1) filled with filling material, comprising: at least one gathering element (2a, 2b) in communication with a control unit (6) for directing the at least one gathering element to have a movement pattern to repeatedly close against and move away from the filled casing with alternating constriction and expansion to thereby facilitate distribution of the sausage in the casing.

17. Device according to claim 16, wherein the at least one gathering element can have a feed movement such that the at least one gathering element travels from an initial position to an end position, wherein the device is configured so that the at least one gathering element can be automatically stopped repeatedly during the feed movement in forward reversal positions between the initial and end positions, then moved back in the direction of the initial position in each case, stopped again in a rear reversal position in each case and in each case set moving in the direction of the end position again.

18. Device according to claim 17, wherein the at least one gathering element comprises a pair of gathering elements that travel from the initial position to the end position, one on each side of the filled casing, wherein the control unit directs the gathering elements to close together toward a transverse center of the filled casing with adjustable degrees of force for the constriction, and wherein at an end position, the gathering elements close together sufficiently tightly that a closure means can embrace it.

19. Device according to claim 16, wherein waiting times for the stopped portion of the movement pattern of the at least one gathering element in forward reversal positions and rear reversal positions can be electronically adjusted.

20. Device according to claim 16, characterized in that the control unit (6) is configured to determine at least one reversal position and/or waiting time and/or the number of changes of direction of the feed movement of the at least one gathering element (2a, 2b) based on at least one property of the sausage in the casing.

* * * * *

UNITED STATES PATENT AND TRADEMARK OFFICE
CERTIFICATE OF CORRECTION

PATENT NO. : 7,871,315 B2  
APPLICATION NO. : 12/179202  
DATED : January 18, 2011  
INVENTOR(S) : Daufratshofer et al.

Page 1 of 1

It is certified that error appears in the above-identified patent and that said Letters Patent is hereby corrected as shown below:

On the Title Page:  
Item (30) Foreign Application Priority Data: Please correct "20 2007 010 587"  
to read -- 20 2007 010 587.8 --

In the Specification:  
Column 1, Line 5: Please add the following:

-- RELATED APPLICATIONS

This application claims priority to German utility model Application Serial No. 20 2007 010 587.8, filed July 27, 2007, the contents of which are hereby incorporated by reference as if recited in full herein. --

Signed and Sealed this  
Fifth Day of July, 2011

David J. Kappos  
*Director of the United States Patent and Trademark Office*